(12) United States Patent
Park (10) Patent No.: US 10,805,527 B2
(45) Date of Patent: Oct. 13, 2020

(54) IMAGE PROCESSING DEVICE AND METHOD

(71) Applicant: HANWHA TECHWIN CO., LTD, Seongnam-si (KR)

(72) Inventor: Sun Ae Park, Seongnam-si (KR)

(73) Assignee: HANWHA TECHWIN CO., LTD., Seongnam-si (KR)

(*) Notice: Subject to any disclaimer, the term of this patent is extended or adjusted under 35 U.S.C. 154(b) by 0 days.

(21) Appl. No.: 16/465,427

(22) PCT Filed: Dec. 29, 2016

(86) PCT No.: PCT/KR2016/015484
§ 371 (c)(1),
(2) Date: May 30, 2019

(87) PCT Pub. No.: WO2018/101533
PCT Pub. Date: Jul. 6, 2018

(65) Prior Publication Data
US 2020/0007758 A1  Jan. 2, 2020

(30) Foreign Application Priority Data
Dec. 1, 2016 (KR) .................. 10-2016-0162925

(51) Int. Cl.
*H04N 5/232* (2006.01)
*G06T 7/11* (2017.01)
(Continued)

(52) U.S. Cl.
CPC ..... *H04N 5/23229* (2013.01); *G06K 9/00221* (2013.01); *G06T 1/60* (2013.01);
(Continued)

(58) Field of Classification Search
CPC ...... H04N 5/23229; H04N 7/183; H04N 7/18; G06T 7/11; G06T 1/60; G06T 5/001;
(Continued)

(56) References Cited

U.S. PATENT DOCUMENTS 7,825,950 B2   11/2010 Rottmann
2015/0161467 A1* 6/2015 Honda ............... G06K 9/00228
                                                        382/203
(Continued)

FOREIGN PATENT DOCUMENTS

GB    2 414 885 A    12/2005
GB    2 428 152 A    1/2007
(Continued)

OTHER PUBLICATIONS

International Search Report (PCT/ISA/210) dated Aug. 18, 2017 issued by the International Searching Authority in International Application No. PCT/KR2016/015484.
(Continued)

*Primary Examiner* — Gevell V Selby
(74) *Attorney, Agent, or Firm* — Sughrue Mion, PLLC (57) ABSTRACT

An image processing device includes: a communication interface configured to receive an original image from a camera; a processor configured to determine a mask area of the original image, extract a switched point among a series of pixels in the mask area, and switch, on the basis of the switched point, a first pixel value of a first pixel set and a second pixel value of a second pixel set and generate a masked image; and a memory storing the masked image and information about the switched point, wherein the switched point is one or more, and the series of pixels sequentially include the first pixel set and the second pixel set.

20 Claims, 9 Drawing Sheets

(51) Int. Cl.
    G06K 9/00      (2006.01)
    G06T 1/60      (2006.01)
    G06T 5/00      (2006.01)
    H04L 29/06     (2006.01)
    H04N 7/18      (2006.01)
    H04W 12/06     (2009.01)

(52) U.S. Cl.
    CPC ............ *G06T 5/001* (2013.01); *G06T 7/11* (2017.01); *H04L 63/083* (2013.01); *H04L 63/0876* (2013.01); *H04N 7/183* (2013.01); *H04W 12/06* (2013.01); *G06T 2200/24* (2013.01); *G06T 2207/20104* (2013.01); *G06T 2207/30232* (2013.01)

(58) Field of Classification Search
    CPC ....... G06T 2200/24; G06T 2207/20104; G06T 2207/30232; G06K 9/00221; H04L 63/083; H04L 63/0876; H04W 12/06
    See application file for complete search history.

(56) References Cited

U.S. PATENT DOCUMENTS

2016/0155465 A1* 6/2016 Park .................. H04N 21/00
                                                386/241
2016/0260235 A1  9/2016 Kao et al.
2017/0013278 A1* 1/2017 Mizuno ................ H04N 19/13

FOREIGN PATENT DOCUMENTS

| | | |
|---|---|---|
| JP | 4402998 B2 | 1/2010 |
| JP | 2015-170954 A | 9/2015 |
| KR | 1993-0011731 A | 6/1993 |
| KR | 10-2005-0048781 A | 5/2005 |
| KR | 10-2006-0062073 A | 6/2006 |
| KR | 10-2012-0035299 A | 4/2012 |
| KR | 10-1378295 B1 | 3/2014 |
| KR | 10-1458136 B1 | 11/2014 |
| KR | 10-1598409 B1 | 3/2016 |
| KR | 10-1621723 B1 | 5/2016 |

OTHER PUBLICATIONS

Written Opinion (PCT/ISA/237) dated Aug. 18, 2017 issued by the International Searching Authority in International Application No. PCT/KR2016/015484.
Jehan Wickramasuriya et al., "Privacy Protecting Data Collection in Media Spaces", ACM Multimedia, 2004, Proceedings of the 12th ACM International Conference on Multimedia, New York, NY, XP058319737, Oct. 10, 2004, pp. 48-55.
Communication dated May 11, 2020, Issued by the European Patent Office in counterpart European Application No. 16922826.9.

* cited by examiner

IMAGE PROCESSING DEVICE AND METHOD

TECHNICAL FIELD

The present disclosure relates to an image processing device and method.

BACKGROUND ART

These days, numerous surveillance cameras have been installed inside or outside a building or on the street for various purposes such as crime prevention and security. The surveillance cameras may be connected to a server in a wired or wireless manner via a network, and the connected multiple cameras may also be simultaneously controlled from the server.

Image processing devices such as surveillance cameras or servers may capture and store images, and the captured or stored images may be viewed via a monitor or the like. To protect privacy, a mask may be required to prevent certain areas of an image from being displayed on a monitor or the like, and thus, a surveillance camera may also generate a mask to be displayed on an image by image processing.

DESCRIPTION OF EMBODIMENTS

Technical Problem

Provided is an image processing technique of restoring a privacy-protected image without loss.

Solution to Problem

An image processing device according to an embodiment of the present disclosure includes: a communication interface configured to receive an original image from a camera; a processor configured to determine a mask area of the original image, extract a switched point among a series of pixels in the mask area, and switch, on the basis of the switched point, a first pixel value of a first pixel set and a second pixel value of a second pixel set and generate a masked image; and a memory storing the masked image and information about the switched point, wherein the switched point is one or more, and the series of pixels sequentially include the first pixel set and the second pixel set.

In the present embodiment, the communication interface may receive a user input for designating the mask area, and the processor may determine the mask area based on the user input.

In the present embodiment, the processor may recognize an object from the original image, and determine the mask area based on the object.

In the present embodiment, the mask area may include a plurality of pixels arranged in a matrix form, and the first processor may rearrange the plurality of pixels to generate the series of pixels.

In the present embodiment, mask area may include a plurality of lines, and each of the plurality of lines may include the series of pixels, and the number and positions of switched points of the plurality of lines may be independent of each other.

In the present embodiment, the plurality of lines may be at least one of a horizontal line, a vertical line, and an oblique line.

In the present embodiment, the plurality of lines may include a first line and a second line, and the first processor may generate the masked image by switching a third pixel value of the first line and a fourth pixel value of the second line.

In the present embodiment, the third pixel value may be a pixel value of a third pixel set which is a partial pixel set of the first line, and the fourth pixel value may be a pixel value of a fourth pixel set which is a partial pixel set of the second line.

In the present embodiment, the communication interface may receive an image request from a user terminal, and transmit the masked image to the user terminal, and the processor may additionally transmit information about the switched point to the user terminal via the communication interface only when user authentication has succeeded based on user authentication information included in the image request or only when terminal authentication has succeeded based on terminal authentication information included in the image request.

An image processing device according to another embodiment of the present disclosure includes: a communication interface configured to transmit an image request to a video recorder and receive a masked image and personal key information from the video recorder; a processor configured to extract a switched point from the personal key information, extract a mask area from the masked image, extract a series of pixels that sequentially include a first pixel set and a second pixel set from the mask area, and switch a first pixel value of the first pixel set and a second pixel value of the second pixel set on the basis of the switched point to generate a restored image; and a display configured to display the masked image or display the restored image on a screen.

In the present embodiment, the image request may include at least one of user authentication information and terminal authentication information.

In the present embodiment, the processor may restore the mask area by rearranging a series of pixels having switched pixel values, in a matrix form.

In the present embodiment, the plurality of lines may include a plurality of lines including a first line and a second line, and the processor may generate the restored image by switching a third pixel value of the first line and a fourth pixel value of the second line.

In the present embodiment, the third pixel value may be a pixel value of a third pixel set which is a partial pixel set of the first line, and the fourth pixel value may be a pixel value of a fourth pixel set which is a partial pixel set of the second line.

An image processing method according to an embodiment of the present disclosure includes: receiving, via a communication interface, an original image from a camera; determining, by using a processor, a mask area of the original image; extracting, by using the processor, a switched point among a series of pixels in the mask area; generating, by using the processor, a masked image by switching a first pixel value of the first pixel set and a second pixel value of the second pixel set on the basis of the switched point; and transmitting, by using the communication interface, the masked image to a user terminal, wherein the series of pixels sequentially include the first pixel set and the second pixel set.

In the present embodiment, the method may further include receiving, by using the communication interface, a user input for designating the mask area, wherein the determining of the mask area includes determining the mask area based on the user input.

In the present embodiment, the method may further include recognizing an object from the original image by using the processor, wherein the determining of the mask area includes determining the mask area based on the object.

In the method according to the present embodiment, the mask area may include a plurality of pixels arranged in a matrix form, and the method may further include generating, by using the processor, the series of pixels by rearranging the plurality of pixels.

In the present embodiment, the method may further include: receiving, by using the communication interface, an image request from the user terminal; determining, by using the processor, whether authentication has succeeded or not based on the image request; and transmitting, by using the communication interface, information about the switched point to the user terminal only when authentication has succeeded.

In the present embodiment, the image request may include at least one of user authentication information and terminal authentication information, and the authentication may include at least one of user authentication and terminal authentication.

Advantageous Effects of Disclosure

According to the embodiments of the present disclosure, a privacy-protected image may be restored without loss, thus enhancing user convenience.

According to the embodiments of the present disclosure, restoration of a privacy-protected image may be restricted, thus tightening security.

BEST MODE

An image processing device according to an embodiment of the present disclosure includes: a communication interface configured to receive an original image from a camera; a processor configured to determine a mask area of the original image, extract a switched point among a series of pixels in the mask area, and switch, on the basis of the switched point, a first pixel value of a first pixel set and a second pixel value of a second pixel set and generate a masked image; and a memory storing the masked image and information about the switched point, wherein the switched point is one or more, and the series of pixels sequentially include the first pixel set and the second pixel set.

MODE OF DISCLOSURE

Since the present disclosure may have various modifications and several embodiments, embodiments are shown in the drawings and will be described in detail. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, the detailed description of known techniques which might unnecessarily obscure the subject matter of the present disclosure will be omitted or made in brief.

While such terms as "first," "second," etc., used in the embodiments below may be used to describe various elements, such elements must not be limited to the above terms. The above terms are used only to distinguish one element from another.

The terms used in the embodiments below are merely used to describe particular embodiments, and are not intended to limit the present disclosure. An expression used in the singular encompasses the expression of the plural, unless it has a clearly different meaning in the context.

In the embodiments below, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The embodiments of the present disclosure may be described in terms of functional block components and various processing steps. Such functional blocks may be realized by any number of hardware and/or software components configured to perform the specified functions. For example, the embodiments of the present disclosure may employ various integrated circuit components, e.g., memory elements, processing elements, logic elements, look-up tables, and the like, which may carry out a variety of functions under the control of one or more micro processors or other control devices. Similarly, where the elements of the embodiments of the present disclosure are implemented using software programming or software elements the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the present disclosure could employ any number of conventional techniques for electronics configuration, signal processing and/or control, data processing and the like. The words "mechanism", "element", "means," or "component" are used broadly and are not limited to mechanical or physical embodiments. These words can include software routines in conjunction with processors, etc.

The embodiments of the present disclosure will now be described with reference to the accompanying drawings.

Figure 1:
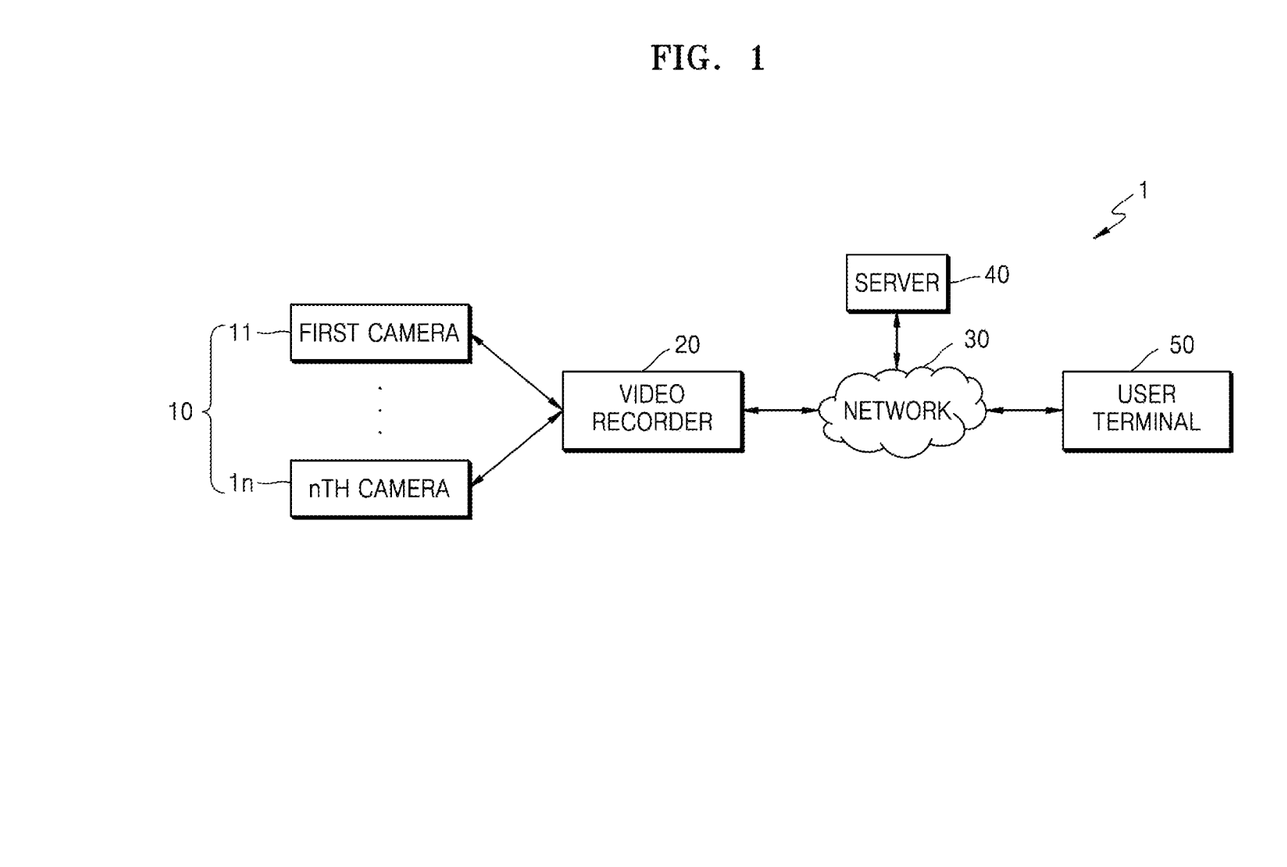
FIG. 1 is a structural diagram of a network camera system according to an embodiment.

FIG. 1 is a structural diagram of a network camera system according to an embodiment.

Referring to FIG. 1, a network camera system 1 according to an embodiment includes a camera 10, a video recorder 20, a network 30, a server 40, and a user terminal 50.

The camera 10 captures an image of a surveillance area to obtain an original image of the surveillance area. The camera 10 may capture an image of a surveillance area in real time for the purpose of surveillance or security. The camera 10 may be a PTZ camera capable of panning and tilting and magnification of a zoom lens. One or more cameras 10 may be included. For example, the network camera system 1 may include a first camera 11 through an nth camera 1n.

The camera 10 may be a low-power camera driven using a battery. A low-power camera maintains a sleep mode in normal situations and wakes up periodically to check whether an event has occurred. When an event has occurred, the low-power camera is converted to an active mode and returns to the sleep mode if no event has occurred. As above, the low-power camera maintains an active mode only when an event occurs, and thus, power consumption may be reduced.

The camera 10 may communicate with a network device by using various communication methods such as wired or wireless LAN (Local Area Network), Wi-Fi, ZigBee, Bluetooth, Near Field Communication or the like. For example, the camera 10 may communicate with a network device according to a low-power communication protocol in which a radio frequency of an ISM band (Industrial Scientific Medical band) is used.

The video recorder 20 records an original image received from the camera 10, and provides the recorded original image to the server 40 or the user terminal 50 via the network 30.

The video recorder 20 may mask the original image, and provide the masked image to the server 40 or the user terminal 50 via the network 30. Here, the video recorder 20 may additionally provide personal key information of the masked image to the server 40 or the user terminal 50. The video recorder 20 may provide personal key information only to the user terminal 50 which has succeeded in authentication.

Meanwhile, the video recorder 20 may provide the masked image to the user terminal 50, and provide personal key information to the server 40. Here, the user terminal 50 may receive personal key information of the masked image from the server 40. The server 40 may provide personal key information only to the user terminal 50 which has succeeded in authentication.

The video recorder 20 may be a digital video recorder, a network video recorder or the like, but is not limited thereto.

The network 30 may include a wired network or a wireless network. The wireless network may be, for example, a 2G (Generation) or 3G cellular communication system, a 3GPP (3rd Generation Partnership Project), a 4G communication system, LTE (Long-Term Evolution), WiMAX (World Interoperability for Microwave Access) or the like.

The server 40 may transmit at least one of the original image, the masked image, and the personal key information received from the video recorder 20 via the network 30, to the user terminal 50.

The server 40 may periodically receive at least one of the original image, the masked image, and the personal key information, from the video recorder 20. The server 40 may periodically transmit at least one of the original image, the masked image, and the personal key information, to the user terminal 50.

The server 40 may transmit at least one of the original image, the masked image, and the personal key information to the user terminal 50 in response to a user input for requesting an image.

The user terminal 50 may display or store the original image or the masked image received from the video recorder 20 or the server 40. The user terminal 50 which has succeeded in authentication may restore the masked image by using the personal key information received from the video recorder 20 or the server 40.

As described above, according to the present disclosure, restoration of a privacy-protected image may be restricted, and thus, security may be tightened.

Also, a privacy-protected image may be restored without loss, thus enhancing user convenience.

Figure 2A:
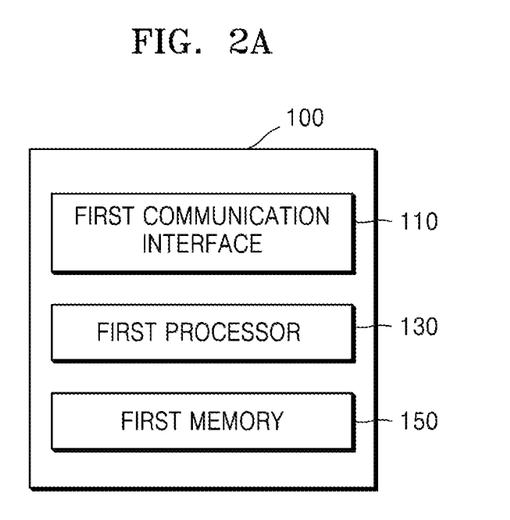
FIGS. 2A and 2B are structural diagrams of an image processing device according to embodiments.
Figure 2B:
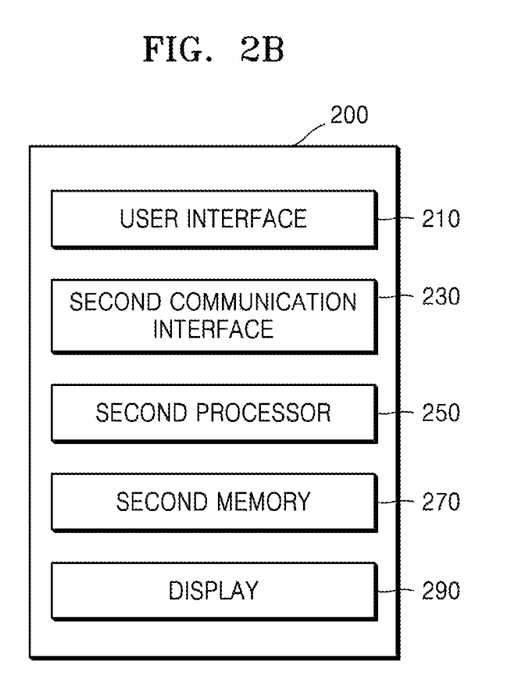

FIGS. 2A and 2B are structural diagrams of an image processing device according to embodiments.

Referring to FIG. 2A, a first image processing device 100 includes a first communication interface 110, a first processor 130, and a first memory 150.

The first communication interface 110 receives an original image from the camera 10.

The first communication interface 110 may receive a user input for designating a mask area from an external device. The external device may be controlled by a business operator or a manager intending to supply a privacy-protected image to the user terminal 50 or the like. A user input for designating a mask area may be a user input for selecting coordinates of the mask area or a user input for designating an object.

The first communication interface 110 may receive an image request from the user terminal 50, and transmit a masked image to the user terminal 50. An image request may include at least one of user authentication information and terminal authentication information. User authentication information may include at least one of user identification information and a user password. Terminal authentication information may include at least one of terminal identification information and a terminal password. A masked image refers to an image which a mask area of an original image is processed not to be recognized.

The first processor 130 determines a mask area of an original image, extracts a switched point among a series of pixels in the mask area, switches, on the basis of the switched point, a first pixel value of a first pixel set and a second pixel value of a second pixel set, and generates a masked image. The switched point may be one or more, and the series of pixels sequentially include the first pixel set and the second pixel set.

The first pixel set includes one or more pixels, and the first pixel value denotes pixel values of the one or more pixels. The second pixel set includes one or more pixels, and the second pixel value denotes pixel values of the one or more pixels.

The first processor 130 may determine a mask area based on a user input for designating a mask area. For example, the first processor 130 may determine a mask area based on coordinates of a mask area selected by a user input.

The first processor 130 may recognize an object from an original image, and determine a mask area based on the object. The object may be a face, a vehicle number or the like. When the object is a face, the first processor 130 may recognize a face from the original image, and determine an area where the face is displayed, as a mask area. When the object is a vehicle number, the first processor 130 may recognize a vehicle number from an original image, and determine a vehicle number plate area as a mask area.

A mask area may include a plurality of pixels arranged in a matrix form, and the first processor 130 may rearrange the plurality of pixels to generate a series of pixels. For example, the first processor 130 may rearrange a plurality of column lines of a matrix into one line to generate a series of pixels.

A mask area may include a plurality of lines, and each of the plurality of lines may include a series of pixels, and the number and positions of switched points of the plurality of lines may be independent of each other. Here, with respect to each of the plurality of lines, the first processor 130 may extract a switched point among a series of pixels and switch, on the basis of the switched point, a first pixel value of a first pixel set and a second pixel value of a second pixel set and generate a masked image.

The plurality of lines may be at least one of a horizontal line, a vertical line, and an oblique line. All of the plurality of lines may be horizontal lines, vertical lines or oblique lines. The plurality of lines may include at least one of a horizontal line, a vertical line, and an oblique line.

The plurality of lines may include a first line and a second line, and the first processor 130 may generate a masked image by switching a third pixel value of the first line and a fourth pixel value of the second line.

Here, with respect to the first line, the first processor 130 may extract a switched point, and switch, on the basis of the switched point, the first pixel value of the first pixel set and the second pixel value of the second pixel set and generate a transformed first line. Also, with respect to the second line, the first processor 130 may extract a switched point, and switch, on the basis of the switched point, the first pixel value of the first pixel set and the second pixel value of the second pixel set and generate a transformed second line. Also, the first processor 130 may switch all pixel values of the transformed first line with all pixel values of the transformed second line to generate a masked image.

Meanwhile, the third pixel value may be a pixel value of a third pixel set which is a partial pixel set of the first line, and the fourth pixel value may be a pixel value of a fourth pixel set which is a partial pixel set of the second line. The third pixel set and the fourth pixel set may each include one or more pixels.

Here, with respect to the first line, the first processor 130 may extract a switched point, and switch, on the basis of the switched point, the first pixel value of the first pixel set and the second pixel value of the second pixel set and generate a transformed first line. Also, with respect to the second line, the first processor 130 may extract a switched point, and switch, on the basis of the switched point, the first pixel value of the first pixel set and the second pixel value of the second pixel set and generate a transformed second line. Also, the first processor 130 may switch a third pixel value of the third pixel set of the transformed first line and a third pixel value of the third pixel set of the transformed second line to generate a masked image.

The first processor 130 may additionally transmit information about the switched point to the user terminal 50 via the first communication interface 110 only when user authentication has succeeded based on user authentication information included in an image request or only when terminal authentication has succeeded based on terminal authentication information included in an image request. Information about a switched point indicates information needed to restore a masked image.

The first processor 130 may determine, based on user identification information included in an image request, whether a user indicated by the user identification information is a user entitled to restore a masked image. The first processor 130 may identify a user entitled to restore a masked image based on user identification information and a user password included in an image request.

The first processor 130 may determine whether a terminal indicated by terminal identification information is a terminal which is allowed to restore a masked image, based on terminal identification information included in an image request. The first processor 130 may identify a terminal allowed to restore a masked image based on terminal identification information and a terminal password included in an image request.

That is, according to the present embodiment, a masked image and personal key information may be transmitted only to the user terminal 50 that has succeeded in authentication, and just a masked image may be transmitted to the user terminal 50 which failed in authentication, thus restricting restoration of a privacy-protected and further tightening security.

The first memory 150 stores a masked image and information about a switched point. The first memory 150 may further store an original image. The first memory 150 may be a line memory that sequentially stores original images in an order that the images are input. That is, an original image in a matrix form is stored from a first row to a final row in the first memory 150, and each row may be sequentially stored in the first memory 150 from a first column to a last column.

Meanwhile, the first processor 130 may store the original images by switching the pixel values of the original images stored in the first memory 150, on the basis of the switched point, to generate a masked image and store the same in the first memory 150. Here, the first processor 130 may match a masked image with information about a switched point and store the matched information in the first memory 150.

The first image processing device 100 may be implemented as any one physical device or a combination in which a plurality of physical devices are systematically combined. The first image processing device 100 may be implemented as the video recorder 20 or the server 40. A portion of the first image processing device 100 may be implemented as the video recorder 20, and the other portion thereof may be implemented as the server 40. Meanwhile, the first image processing device 100 may be implemented as a portion of the user terminal 50.

Referring to FIG. 2B, the second image processing device 200 includes a user interface 210, a second communication interface 230, a second processor 250, a second memory 270, and a display 290.

The user interface 210 receives a user input. A user input received via the user interface 210 may include at least one of user authentication information and terminal authentication information.

The second communication interface 230 transmits an image request to the video recorder 20, and receives a masked image and personal key information from the video recorder 20. An image request may include at least one of user authentication information and terminal authentication information.

The second processor 250 may perform a mask processing performed by the first processor 130 in a reverse order on the masked image to thereby restore the mask area of the masked image.

The second processor 250 may extract a switched point from the personal key information, extract a mask area from the masked image, extract a series of pixels that sequentially include a first pixel set and a second pixel set from the mask area, and switch a first pixel value of the first pixel set and a second pixel value of the second pixel set on the basis of the switched point to generate a restored image.

Here, the second processor 250 may restore the mask area by rearranging a series of pixels having switched pixel values, in a matrix form. For example, the second processor 250 may divide one line consisting of a series of pixels having switched pixel values, into n lines respectively including m pixels. Next, the second processor 250 may rearrange the n lines in an order to restore a mask area in an m×n matrix form.

Meanwhile, a mask area may include a plurality of lines, and each of the plurality of lines may include a series of pixels, and the number and positions of switched points of the plurality of lines may be respectively independent of each other. Here, the second processor 250 may extract a switched point from personal key information with respect to each of a plurality of lines, and switch, on the basis of the switched point, the first pixel value of the first pixel set and the second pixel value of the second pixel set to generate a restored image.

The plurality of lines may include a first line and a second line, and the second processor 250 may generate a restored image by switching a third pixel value of the first line and a fourth pixel value of the second line.

Here, with respect to the first line, the second processor 250 may extract a switched point, and switch, on the basis of the switched point, the first pixel value of the first pixel set and the second pixel value of the second pixel set to generate a transformed first line. Also, with respect to the second line, the second processor 250 may extract a switched point and switch, on the basis of the switched point, the first pixel value of the first pixel set and the second pixel value of the second pixel set to generate a transformed second line. Also, the second processor 250 may switch all pixel values of the transformed first line with all pixel values of the transformed second line to generate a restored image.

Meanwhile, the third pixel value may be a pixel value of a third pixel set which is a partial pixel set of the first line, and the fourth pixel value may be a pixel value of a fourth pixel set which is a partial pixel set of the second line.

Here, with respect to the first line, the second processor 250 may extract a switched point, and switch, on the basis of the switched point, the first pixel value of the first pixel set and the second pixel value of the second pixel set to generate a transformed first line. Also, the second processor 250 may extract, with respect to the second line, a switched point and switch, on the basis of the switched point, the first pixel value of the first pixel set and the second pixel value of the second pixel set to generate a transformed second line. Also, the second processor 250 may switch the third pixel value of the third pixel set of the transformed first line and the third pixel value of the third pixel set of the transformed second line to generate a restored image.

The second memory 270 stores a masked image, personal key information, a restored image or the like. The second memory 270 may be a line memory that sequentially stores masked images in an order that the images are input. That is, a masked image in a matrix form is stored from a first row to a final row in the second memory 270, and each row may be sequentially stored in the second memory 270 from a first column to a last column.

Meanwhile, the second processor 250 may store the masked images by switching the pixel values of the masked images stored in the second memory 270, on the basis of the switched point, to generate a restored image and store the same in the second memory 270. Here, the second processor 250 may match a masked image with a restored image and store the matched images in the second memory 270.

The display 290 displays the masked image or a restored image on a screen.

The second image processing device 200 may be implemented as any one physical device or a combination in which a plurality of physical devices are systematically combined. Meanwhile, the second image processing device 200 may be implemented as the user terminal 50. A portion of the second image processing device 200 may be implemented as the user terminal 50, and the other portion thereof may be implemented as the video recorder 20 or the server 40.

Hereinafter, an image processing method according to an embodiment will be described in detail with reference to FIGS. 3 through 7.

Figure 3:
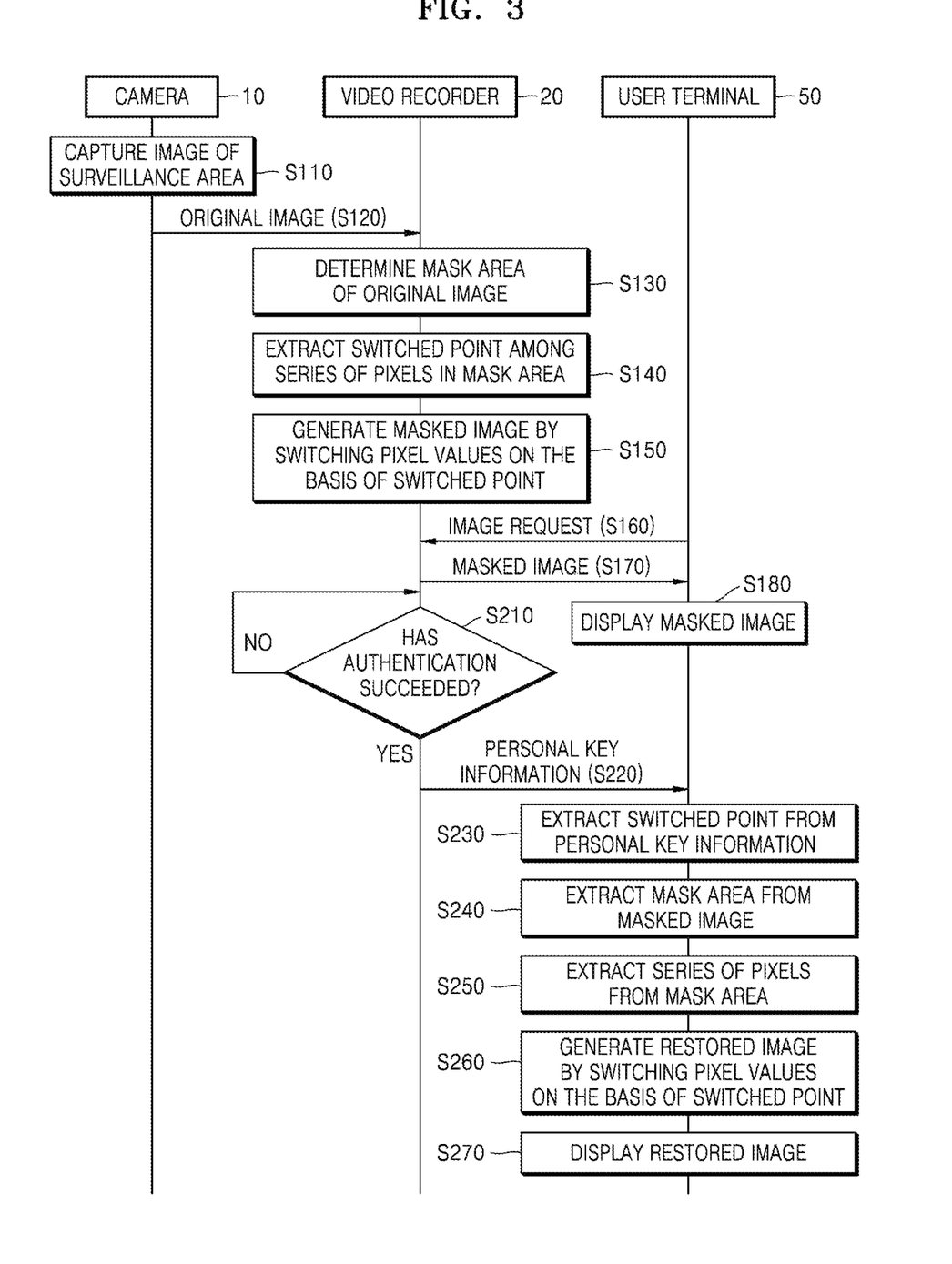
FIG. 3 is a flowchart for describing an image processing method according to an embodiment.

FIG. 3 is a flowchart for describing an image processing method according to an embodiment.

Referring to FIG. 3, the camera 10 captures an image of a surveillance area (S110). The camera 10 captures an image of the surveillance area to generate an original image.

The video recorder 20 receives an original image from the camera 10 (S120). Here, the video recorder 20 may receive, from the camera 10, together with the original image, a capturing time of the original image, information about an event, and camera identification information.

Next, the video recorder 20 determines a mask area of the original image (S130).

The video recorder 20 may mask all original images received from the camera 10.

The video recorder 20 may determine whether to mask an original image based on a capturing time of the original image received from the camera 10. For example, the video recorder 20 may generate a mask image of only original images that are captured at a predetermined time. For example, the video recorder 20 may generate a mask image of only original images that are captured at a time except for a predetermined time.

The video recorder 20 may determine whether to mask an original image based on information about an event, received from the camera 10. For example, the video recorder 20 may generate a mask image of only original images that are captured in response to a predetermined event. For example, the video recorder 20 may generate a mask image of only original images that are captured in response to events except for a predetermined event.

The video recorder 20 may determine whether to mask an original image based on a capturing time of the original image received from the camera 10. For example, the video recorder 20 may generate a mask image of only original images that are captured at a predetermined time. For example, the video recorder 20 may generate a mask image of only original images that are captured at a time except for a predetermined time.

The video recorder 20 may determine whether to mask an original image based on camera identification information received from the camera 10. For example, the video recorder 20 may generate a mask image of only original images that are received from a first camera 11 installed in a predetermined region.

The video recorder 20 may determine all areas of an original image as a mask area. For example, the video recorder 20 may mask all areas of an original image that is captured in response to a predetermined event. For example, the video recorder 20 may mask all areas of an original image received from the first camera 11 installed in a predetermined region. For example, the video recorder 20 may mask all areas of an original image that are captured at a predetermined time.

The video recorder 20 may determine a portion of an original image as a mask area. Hereinafter, a portion of an original image determined as a mask area will be described with reference to FIG. 4.

Figure 4:
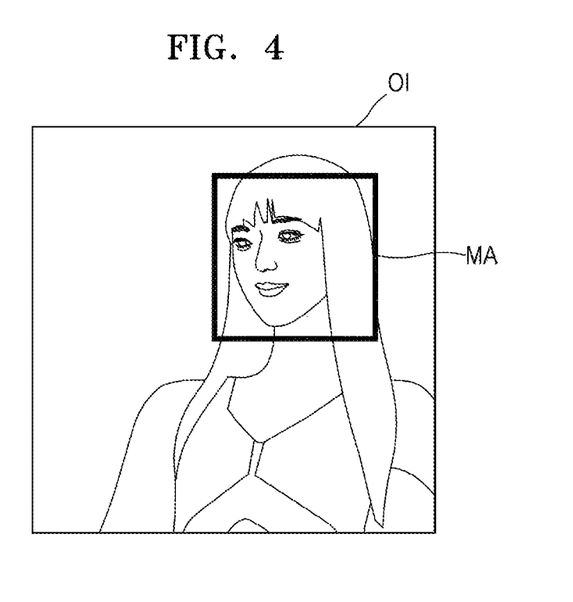
FIG. 4 is a diagram for describing a mask area according to an embodiment.

FIG. 4 is a diagram for describing a mask area according to an embodiment.

Referring to FIG. 4, the video recorder 20 may determine a portion of an original image OI received from the camera 10 as a mask area MA.

A shape of the mask area MA may be a square as illustrated in FIG. 4, a polygon other than a square, a circle, or a closed curve in various forms such as an outline of an object.

Hereinafter, a method of determining a mask area will be described with reference to FIGS. 5A and 5B.

Figure 5A:
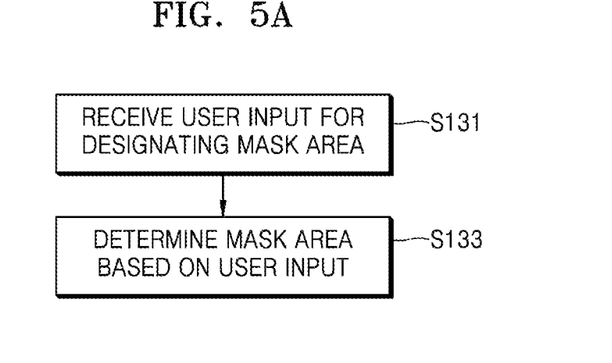
FIGS. 5A and 5B are flowcharts for describing a mask area determining method according to embodiments.
Figure 5B:
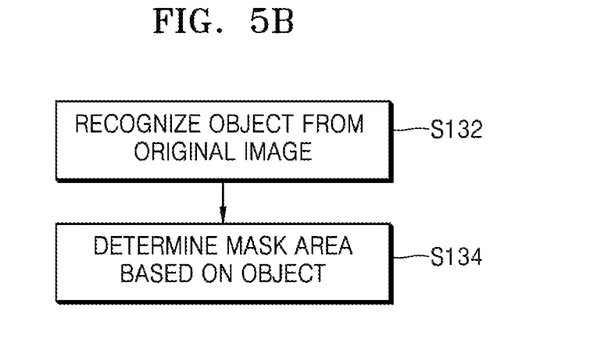

FIGS. 5A and 5B are flowcharts for describing a mask area determining method according to embodiments.

Referring to FIG. 5A, the video recorder 20 receives a user input for designating a mask area (S131).

A user input for designating a mask area may be a user input for selecting coordinates of four vertexes of the mask area MA. For example, a user input for designating a mask area may be a user input for selecting each of four vertexes or a user input for selecting one vertex and the other vertex diagonal thereto, but is not limited thereto.

A user input for designating a mask area may be a user input for selecting any one point within the mask area MA. For example, a user input for designating a mask area may be a user input for selecting a predetermined object.

The user input for designating a mask area may be one or more.

Meanwhile, the video recorder 20 determines a mask area based on a user input (S133).

The video recorder 20 may determine a mask area MA positioned at coordinates of four vertexes based on a user input for selecting coordinates of four vertexes.

The video recorder 20 may determine a mask area MA having a predetermined area based on any one point selected by the user input based on the user input for selecting any one point within the mask area MA. For example, the video recorder 20 may determine a mask area MA having an area covering a predetermined face based on a user input for selecting a predetermined face.

Referring to FIG. 5B, the video recorder 20 recognizes an object from an original image (S132).

The video recorder 20 may recognize one or more faces or one or more vehicle numbers from an original image.

The video recorder 20 may recognize one or more predetermined faces or one or more predetermined vehicle numbers from an original image. The one or more predetermined faces may indicate predetermined persons. The one or more predetermined vehicle numbers may indicate vehicle numbers registered to a predetermined region or vehicle numbers including predetermined numbers.

Next, the video recorder 20 determines a mask area based on the recognized object (S134).

The video recorder 20 may determine a mask area MA having an area covering a face. For example, the video recorder 20 may determine one or more mask areas MA covering each of one or more faces displayed on an original image. For example, the video recorder 20 may determine one or more mask areas MA covering faces without glasses from among one or more faces displayed on an original image.

The video recorder 20 may determine a vehicle number plate area as a mask area MA. For example, the video recorder 20 may determine one or more vehicle number plate areas displayed on an original image as a mask area MA. For example, the video recorder 20 may determine a vehicle number plate area not including predetermined numbers from among the one or more vehicle number plate areas displayed on an original image, as a mask area MA.

Referring back to FIG. 3, the video recorder 20 extracts a switched point among a series of pixels within the mask area (S140). The series of pixels sequentially include a first pixel set and a second pixel set.

Next, the video recorder 20 generates a masked image by switching a first pixel value of the first pixel set and a second pixel value of the second pixel set on the basis of the switched point (S150).

Hereinafter, a method of generating a masked image will be described in detail with reference to FIGS. 6A through 6D.

FIGS. 6A through 6D are diagrams for describing a mask processing method according to embodiments.

Figure 6A:
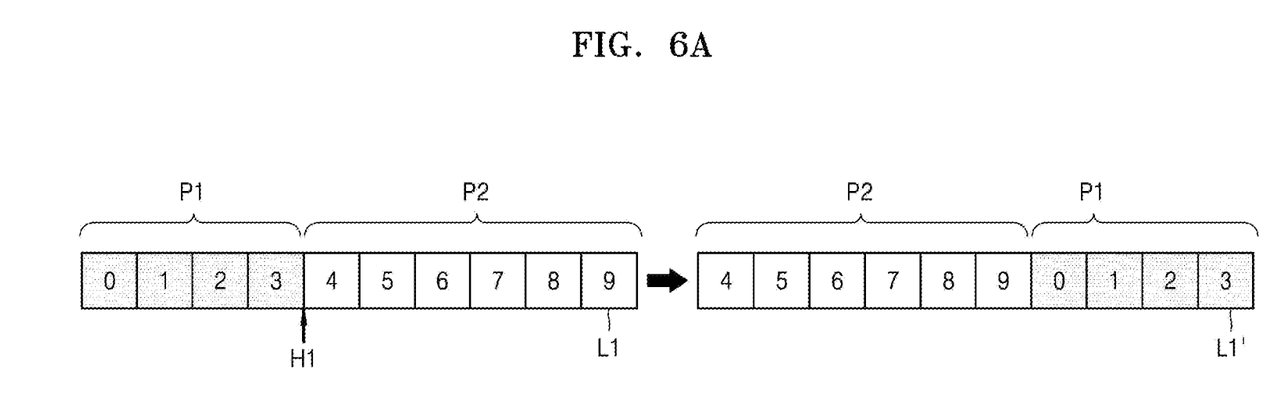
FIGS. 6A through 6D are diagrams for describing a mask processing method according to embodiments.

Referring to FIG. 6A, for example, a first line L1 in within a mask area MA of an original image OI may include a series of pixels having pixel values of 0 to 9. That is, a series of pixels of the first line L1 may sequentially include a first pixel set P1 having first pixel values of 0 to 3 and a second pixel set P2 having second pixel values of 4 to 9.

The video recorder 20 may extract a first switched point H1 among a series of pixels constituting the first line L1 in the mask area MA of the original image OI.

The video recorder 20 may generate a masked image by switching the first pixel values of 0 through 3 of the first pixel set P1 and the second pixel values of 4 through 9 of the second pixel set P2 on the basis of the first switched point H1.

Accordingly, a transformed first line L1' in the mask area MA of a masked image MI may include a series of pixels having pixel values of 4 through 9 and 0 through 3.

Figure 6B:
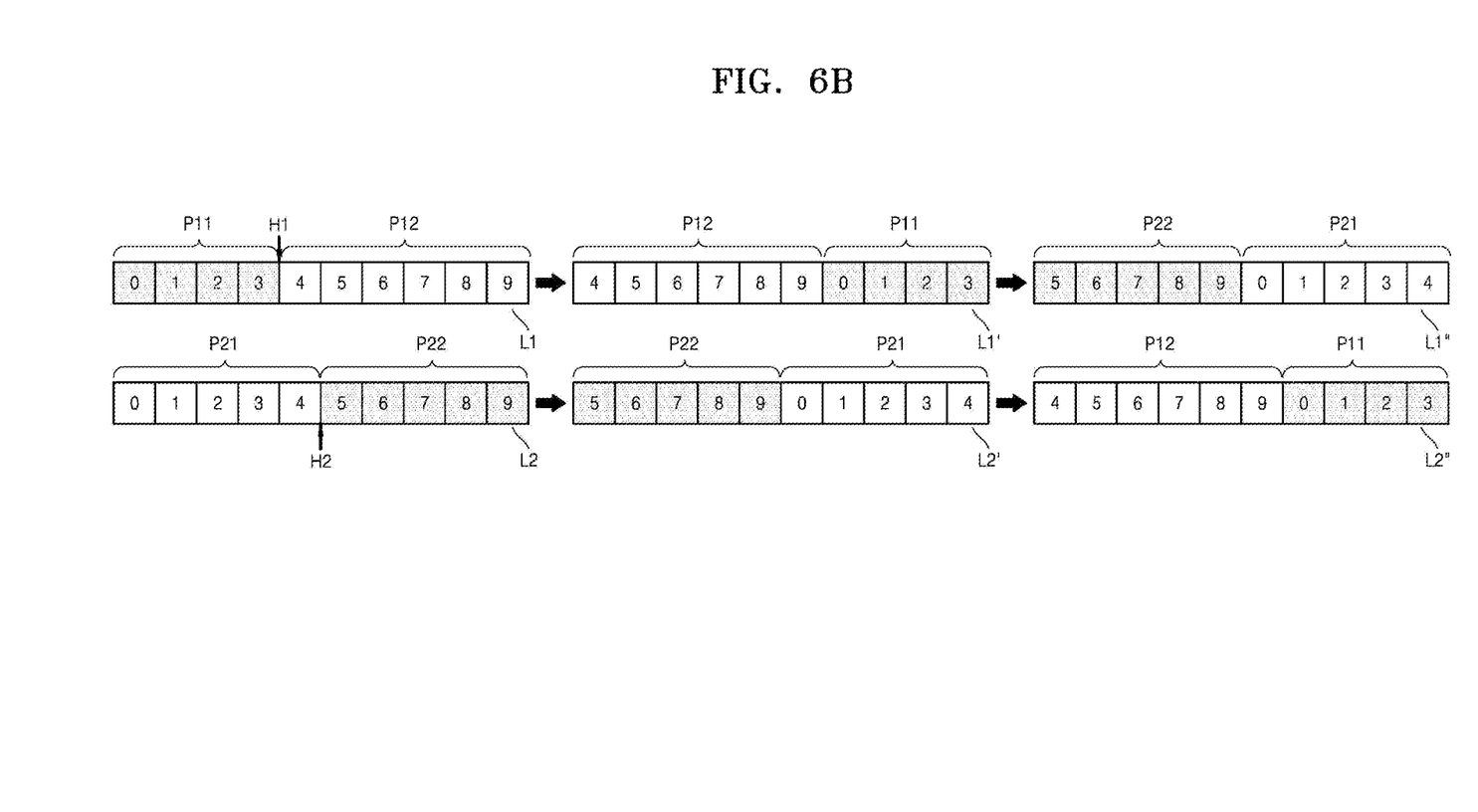

Referring to FIG. 6B, for example, a first line L1 and a second line L2 within a mask area MA of an original image OI may each include a series of pixels having pixel values of 0 to 9. That is, a series of pixels of the first line L1 may sequentially include a first pixel set P11 having first pixel values of 0 to 3 and a second pixel set P12 having second pixel values of 4 to 9. A series of pixels of the second line L2 may sequentially include a first pixel set P21 having first pixel values of 0 to 4 and a second pixel set P22 having second pixel values of 5 to 9.

With respect to the first line L1, the video recorder 20 may extract a first switched point H1, and generate a first transformed first line L1', by switching the first pixel values of 0 through 3 of the first pixel set P11 and the second pixel values of 4 through 9 of the second pixel set P12 on the basis of the first switched point H1. With respect to the second line L2, the video recorder 20 may extract a second switched point H2, and generate a first transformed second line L2', by switching the first pixel values of 0 through 4 of the first pixel set P21 and the second pixel values of 5 through 9 of the second pixel set P22 on the basis of the second switched point H2.

Also, the video recorder 20 may generate a masked image by switching all of the pixel values of 4 through 9 and 0 through 3 of the first transformed first line L1' with all of the pixel values of 5 through 9 and 0 through 4 of the first transformed second line L2'.

Accordingly, a second transformed first line L1", in the mask area MA of the masked image MI may include a series of pixels having pixel values of 5 through 9 and 0 through 4, and a second transformed second line L2", in the mask area MA of the masked image MI may include a series of pixels having pixel values of 4 through 9 and 0 through 3.

Figure 6C:
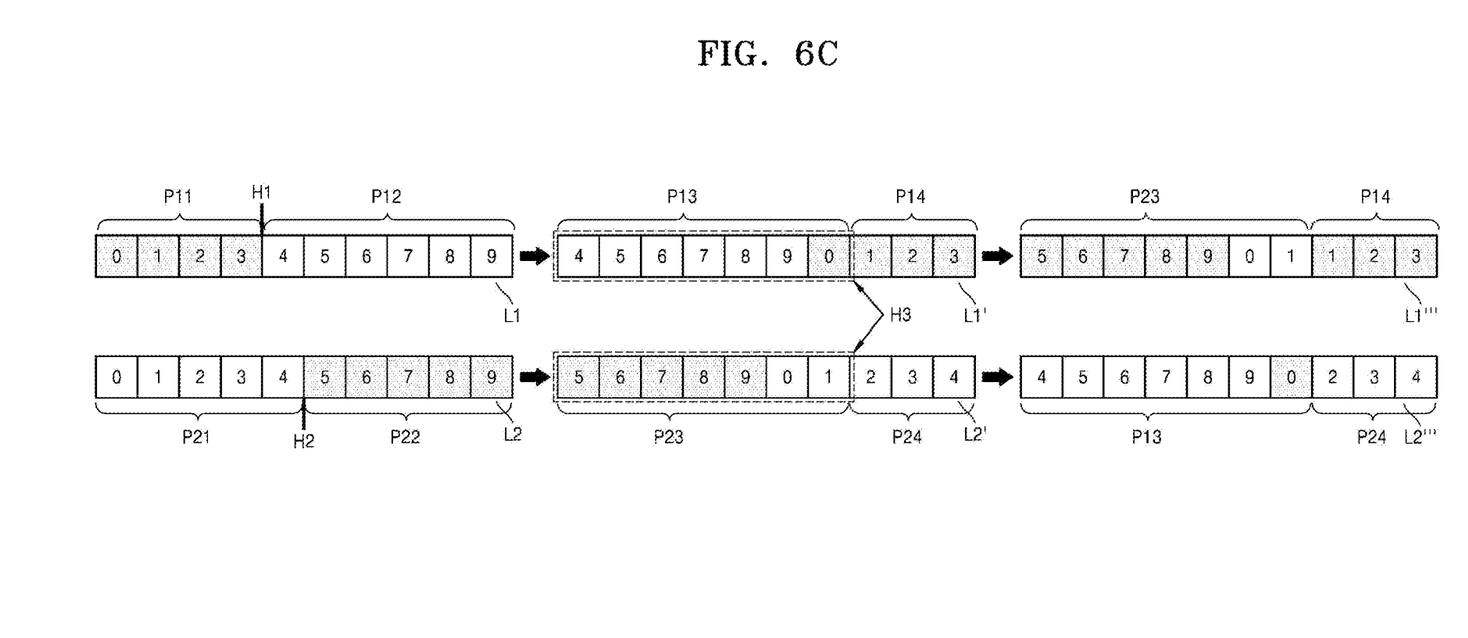

Referring to FIG. 6C, for example, a first line L1 and a second line L2 in a mask area MA of an original image OI may include a series of pixels having pixel values of 0 to 9. That is, a series of pixels of the first line L1 may sequentially include a first pixel set P11 having first pixel values of 0 to 3 and a second pixel set P12 having second pixel values of 4 to 9. A series of pixels of the second line L2 may sequentially include a first pixel set P21 having first pixel values of 0 to 4 and a second pixel set P22 having second pixel values of 5 to 9.

With respect to the first line L1, the video recorder 20 may extract a first switched point H1, and generate a first transformed first line L1', by switching the first pixel values of 0 through 3 of the first pixel set P11 and the second pixel values of 4 through 9 of the second pixel set P12 on the basis of the first switched point H1. With respect to the second line L2, the video recorder 20 may extract a second switched point H2, and generate a first transformed second line L2', by switching the first pixel values of 0 through 4 of the first pixel set P21 and the second pixel values of 5 through 9 of the second pixel set P22 on the basis of the second switched point H2.

Also, the video recorder 20 may extract a third switched point H3 among a series of pixels constituting the first transformed first line L1' and a series of pixels constituting the first transformed second line L2'.

The video recorder 20 may generate a masked image by switching, on the basis of the third switched point H3, the third pixel values of 4 through 9, and 0 of the third pixel set P13 of the first transformed first line L1 and the third pixel values of 5 through 9, 0, and 1 of the third pixel set P23 of the first transformed second line L2'.

Accordingly, a second transformed first line L1''', in the mask area MA of the masked image MI may include a series of pixels having pixel values of 5 through 9, 0, 1, and 1 through 3, and a second transformed second line L2''', in the mask area MA of the masked image MI may include a series of pixels having pixel values of 4 through 9, 0, and 2 through 4.

Figure 6D:
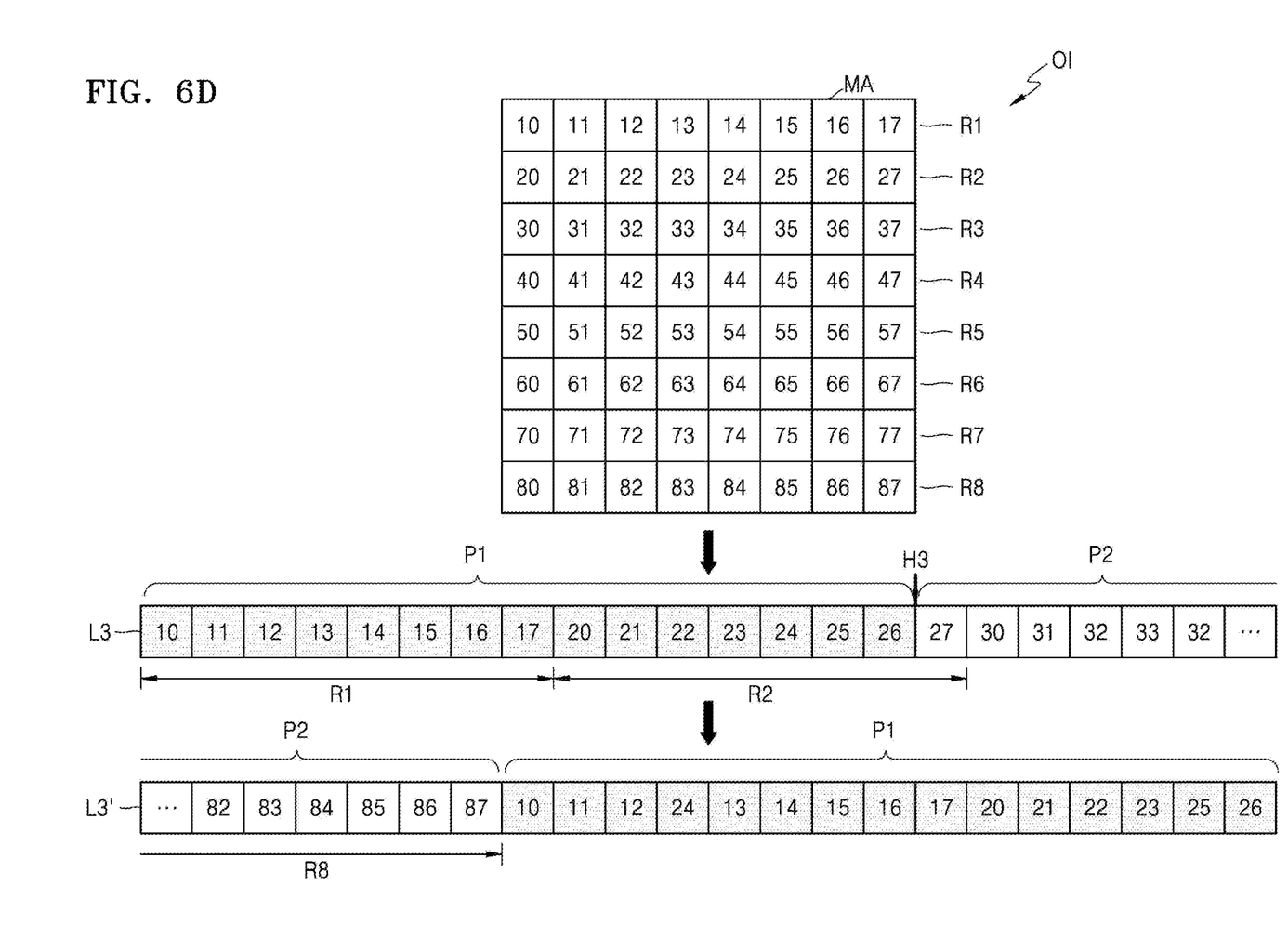

Referring to FIG. 6D, for example, a mask area MA of an original image OI may include a plurality of pixels arranged in a matrix form.

The video recorder 20 may generate a series of pixels by rearranging the plurality of pixels. For example, the video recorder 20 may generate a series of pixels by rearranging first column line R1 through eighth column line R8 of a matrix into a third line L3. Here, the video recorder 20 may sequentially list the first column line R1 through the eighth column line R8 to generate a third line L3. A series of pixels included in the third line L3 may sequentially include a first pixel set P1 having first pixel values of 10 to 26 and a second pixel set P2 having second pixel values of 27 through 87.

The video recorder 20 may extract a third switched point H3 among a series of pixels constituting the third line L3 in the mask area MA of the original image OI.

The video recorder 20 may generate a masked image by switching the first pixel values of 10 through 26 of the first pixel set P1 and the second pixel values of 27 through 87 of the second pixel set P2 on the basis of the third switched point H3.

Accordingly, a transformed third line L3' in the mask area MA of a masked image MI may include a series of pixels having pixels values of 27 through 87 and 10 through 26.

Hereinafter, a masked area will be described with reference to FIG. 7.

Figure 7:
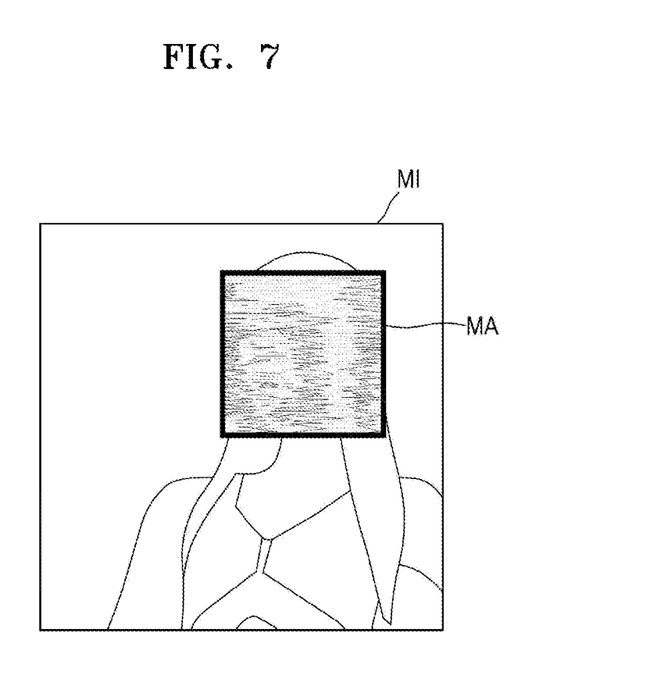
FIG. 7 is a diagram for describing a masked image according to an embodiment.

FIG. 7 is a diagram for describing a masked image according to an embodiment.

Referring to FIG. 7, the mask area MA of the masked image MI according to the present embodiments may be masked such that a corresponding area of the original image OI is not recognizable.

Referring back to FIG. 3, the video recorder 20 receives an image request from the user terminal 50 (S160). An image request may include at least one of user authentication information and terminal authentication information.

Next, the video recorder 20 transmits a masked image to the user terminal 50 (S170). The video recorder 20 may transmit a masked image to the user terminal 50 in response to the image request.

The user terminal 50 displays the masked image on a screen (S180).

As above, the network camera system 1 according to the present embodiment may enhance security by displaying a privacy-protected image by using the user terminal 50.

Meanwhile, the video recorder 20 determines whether authentication has succeeded based on the image request (S210). Authentication may include at least one of user authentication and terminal authentication.

The video recorder 20 transmits personal key information including information about a switched point, to the user terminal 50 only when authentication has succeeded (S220).

The user terminal 50 may extract a switched point from the personal key information (S230), extract a mask area from the masked image (S240), extract a series of pixels that sequentially include a first pixel set and a second pixel set from the mask area (S250), and generate a restored image by switching a first pixel value of the first pixel set and a second pixel value of the second pixel set on the basis of the switched point (S260).

The user terminal 50 displays a restored image on the screen (S270).

As above, the network camera system 1 according to the present embodiment may restore a privacy-protected image by using the user terminal 50 without loss, and thus may enhance user convenience.

Also, the network camera system 1 according to the present embodiment may enhance security by restricting restoration of a privacy-protected image by using the user terminal 50.

While the present disclosure has been particularly shown and described with reference to embodiments thereof, it will be understood by those of ordinary skill in the art that various changes in form and details may be made therein without departing from the spirit and scope of the present disclosure as defined by the appended claims.

The embodiments should thus be considered in a descriptive sense only and not for purposes of limitation. Therefore, the scope of the present disclosure is defined not by the detailed description but by the appended claims, and all differences within the scope will be construed as being included in the present disclosure.

INDUSTRIAL APPLICABILITY

The present disclosure is likely to be used in image processing systems of various forms.

The invention claimed is:
1. An image processing device comprising:
a communication interface configured to receive an original image from a camera;
a processor configured to determine a mask area of the original image, extract a switched point among a series of pixels in the mask area, and switch, on the basis of the switched point, a first pixel value of a first pixel set and a second pixel value of a second pixel set and generate a masked image; and
a memory storing the masked image and information about the switched point, wherein the switched point is one or more, and
the series of pixels sequentially comprise the first pixel set and the second pixel set.

2. The image processing device of claim 1, wherein the communication interface is configured to receive a user input for designating the mask area, and
the processor determines the mask area based on the user input.

3. The image processing device of claim 1, the processor recognizes an object from the original image, and determines the mask area based on the object.

4. The image processing device of claim 1, wherein the mask area comprises a plurality of pixels arranged in a matrix form, and
the processor generates the series of pixels by rearranging the plurality of pixels.

5. The image processing device of claim 1, wherein the mask area comprises a plurality of lines,
the plurality of lines each comprise the series of pixels, and
the number and positions of the switched points of the plurality of lines are respectively independent of each other.

6. The image processing device of claim 5, wherein the plurality of lines comprise at least one of a horizontal line, a vertical line, and an oblique line.

7. The image processing device of claim 5, wherein the plurality of lines comprise a first line and a second line, and
the processor generates the masked image by switching a third pixel value of the first line and a fourth pixel value of the second line.

8. The image processing device of claim 7, wherein the third pixel value comprises a pixel value of a third pixel set which is a partial pixel set of the first line, and
the fourth pixel value comprises a pixel value of a fourth pixel set which is a partial pixel set of the second line.

9. The image processing device of claim 1, wherein the communication interface receives an image request from a user terminal, and transmits the masked image to the user terminal, and
the processor additionally transmits information about the switched point to the user terminal via the communication interface only when user authentication has succeeded based on user authentication information included in the image request or only when terminal authentication has succeeded based on terminal authentication information included in the image request.

10. An image processing device comprising:
a communication interface configured to transmit an image request to a video recorder and receive a masked image and personal key information from the video recorder;
a processor configured to extract a switched point from the personal key information, extract a mask area from the masked image, extract a series of pixels that sequentially include a first pixel set and a second pixel set from the mask area, and switch a first pixel value of the first pixel set and a second pixel value of the second pixel set on the basis of the switched point to generate a restored image; and
a display configured to display the masked image or display the restored image on a screen.

11. The image processing device of claim 10, wherein the image request comprises at least one of user authentication information and terminal authentication information.

12. The image processing device of claim 10, wherein the processor restores the mask area by rearranging a series of pixels having switched pixel values, in a matrix form.

13. The image processing device of claim 10, wherein the mask area comprises a plurality of lines including a first line and a second line, and
the processor generates a restored image by switching a third pixel value of the first line and a fourth pixel value of the second line.

14. The image processing device of claim 13, wherein the third pixel value comprises a pixel value of a third pixel set which is a partial pixel set of the first line, and
wherein the fourth pixel value comprises a pixel value of a fourth pixel set which is a partial pixel set of the second line.

15. An image processing method, the image processing method comprising:
receiving, via a communication interface, an original image from a camera;
determining, by using a processor, a mask area of the original image;
extracting, by using the processor, a switched point among a series of pixels in the mask area;
generating, by using the processor, a masked image by switching a first pixel value of a first pixel set and a second pixel value of a second pixel set on the basis of the switched point; and
transmitting, by using the communication interface, the masked image to a user terminal,
wherein the series of pixels sequentially comprise the first pixel set and the second pixel set.

16. The image processing method of claim 15, further comprising receiving, by using the communication interface, a user input for designating the mask area,
wherein the determining of the mask area comprises determining the mask area based on the user input.

17. The image processing method of claim 15, further comprising recognizing an object from the original image by using the processor,
wherein the determining of the mask area comprises determining the mask area based on the object.

18. The image processing method of claim 15, wherein the mask area comprises a plurality of pixels arranged in a matrix form, and
the image processing method further comprises generating, by using the processor, the series of pixels by rearranging the plurality of pixels.

19. The image processing method of claim 15, further comprising: receiving, by using the communication interface, an image request from the user terminal;
determining, by using the processor, whether authentication has succeeded or not based on the image request; and
transmitting, by using the communication interface, information about the switched point to the user terminal only when authentication has succeeded.

20. The image processing method of claim 19, wherein the image request comprises at least one of user authentication information and terminal authentication information, and
the authentication comprises at least one of user authentication and terminal authentication.

* * * * *